Dec. 4, 1923.

L. M. SINGER

SUPPORTING DEVICE FOR AUTOMOBILE BUMPERS

Filed Dec. 20, 1922   2 Sheets-Sheet 1

1,476,311

INVENTOR
L. M. Singer.
BY J. Edward Maybe
ATTY.

Dec. 4, 1923.
L. M. SINGER
SUPPORTING DEVICE FOR AUTOMOBILE BUMPERS
Filed Dec. 20, 1922
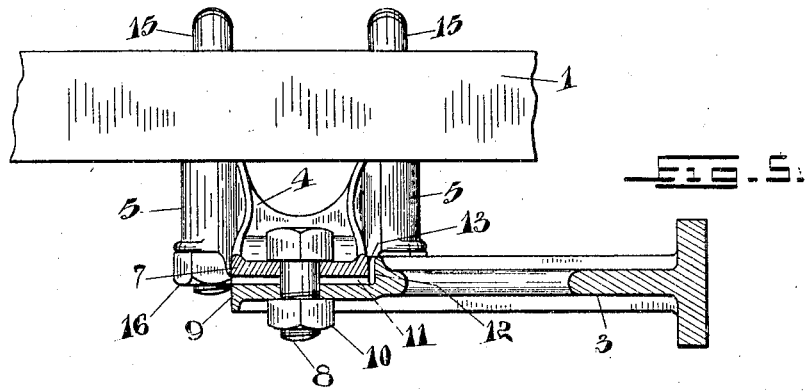
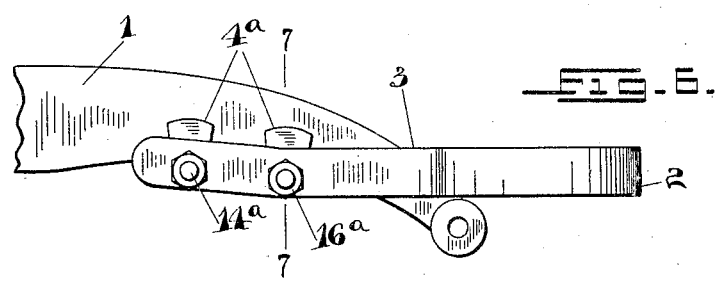
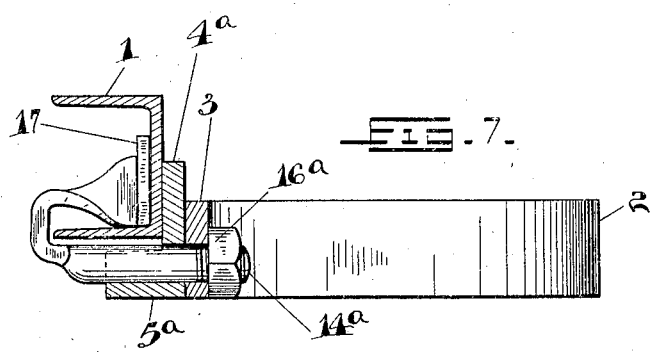
INVENTOR
L. M. Singer
BY J. Edward Maybee
ATTY Patented Dec. 4, 1923.

1,476,311

UNITED STATES PATENT OFFICE.

LOUIS M. SINGER, OF TORONTO, ONTARIO, CANADA.

SUPPORTING DEVICE FOR AUTOMOBILE BUMPERS.

Application filed December 20, 1922. Serial No. 608,022.

*To all whom it may concern:*

Be it known that I, LOUIS M. SINGER, resident of the city of Toronto, in the county of York, Province of Ontario, Canada, a subject of the King of Great Britain, have invented certain new and useful Improvements in Supporting Devices for Automobile Bumpers, of which the following is a specification.

This invention relates particularly to devices for securing the supporting arms of automobile bumpers to the channel bars which usually form the side members of the chassis of the vehicle in such a manner that any one set of connections is adapted for use with many different makes of vehicles.

It has been proposed in the past to clamp a supporting member or members to the channel bar side member by means of hook bolts engaging one of the flanges of the channelled member and adapted to draw the supporting member against the web of the channel but, unless special provision is made to guard against it, the outer ends of the hook bolts tend to sag so that the supporting members are not held flat against the web of the channel member, which is not only objectionable on the ground of appearance but also reduces the efficiency of the device. Other devices previously employed which were not subject to the aforesaid objection were too complicated and expensive. My object therefore is to devise a form of clamp which will take the place of hook bolts while possessing equal simplicity, which will not sag at the outer side of the channel member but will clamp the supporting member flatly against the web of the channel. A further object is to so construct the device that a bumper may thereby be fitted to any one of a large number of different models of chassis by the one device and so that the device does not require to be made in rights and lefts, but may be used at either side of the automobile; and to make the device adjustable so that a bumper may be supported in different positions on any given chassis.

I attain my object by means of the constructions hereinafter described and illustrated in the accompanying drawings, in which—

Figure 1:
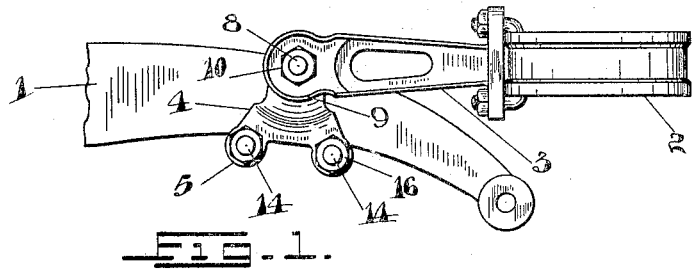
Figure 2:
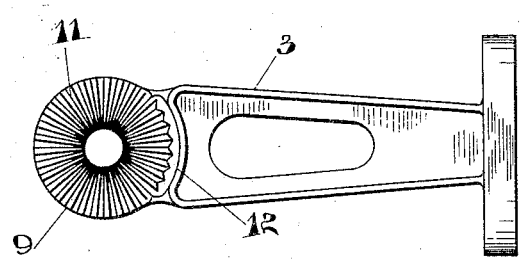
Figure 4:
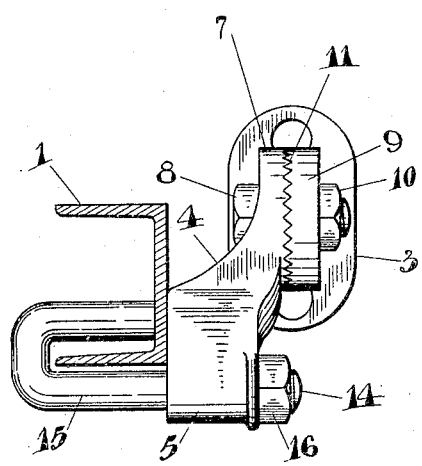
Figure 3:
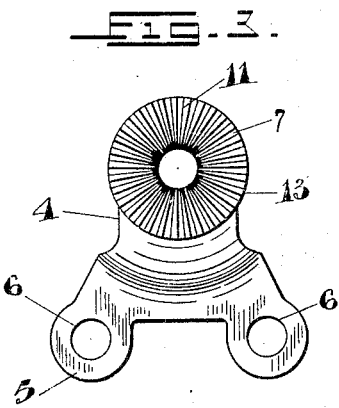

Fig. 1 is a side elevation showing part of a channel side member of the chassis of an automobile and part of a bumper secured thereto in accordance with my invention;

Fig. 2 a side elevation of the supporting arm;

Fig. 3 a side elevation of a clamp member on which the supporting arm is adjustably pivoted;

Fig. 4 an end elevation of the clamping member and clamp bar secured in position on the channel member, the channel member being shown in section;

Fig. 5 a section through the adjustable pivotal connection between the supporting arm and clamp member;

Fig. 6 a side elevation showing one of the supporting arms of the bumper formed integral with the impact receiving member connected to the channel bar member by two independent clamp devices; and Fig. 7 a cross section on the line 7—7 in Fig. 6 looking towards the right.

1 is a side member of the chassis of an automobile of the common channel form, the web being at the outer side. 2 is a bumper, which may be of any ordinary construction, and which is provided at each side with a rearwardly extending part 3 forming a supporting arm. This arm may be integral with the impact receiving portion of the bumper as shown in Figs. 6 and 7 but is preferably a separate part as shown in Figs. 1 and 2 of the drawings.

When the supporting arm is formed as a separate part, it is pivotally connected with a clamp member 4 as to be angularly adjustable relative thereto in a vertical plane, the specific construction of this connection being hereinafter described.

The clamp member 4 is preferably roughly triangular in outline as shown particularly in side elevation, and is adapted at its lower part to contact with the outer face of the web of the channel member 1. At opposite ends at one side of the triangle are formed lugs 5 provided with holes 6 through which clamp bars may pass. At the angle of the triangle opposite the side on which are located the lugs 5 is formed a substantially circular boss 7, which is offset so that it is spaced from the web of the channel member when the clamp member is in position, thus providing room for the head of the pivot bolt 8 which extends through the lug. This pivot bolt, it will be noted, is symmetrically positioned relative to the holes 6 so that the clamp member may be used indifferently at either the right or left hand side of the chassis of the automobile.

The pivot bolt extends, as described, through the boss 7 and also through the boss 9 formed on the rearward end of the supporting arm 3. A nut 10 threaded on the end of the bolt provides means for clamping the two bosses together. While the two parts may be frictionally held from movement by tightening up the nut 10, it is preferable to provide an interlocking engagement, and the faces of the two bosses are therefore formed with radial ribs or corrugations 11 adapted to interlock with one another. The construction described enables the supporting arm to be extended at the proper angle to support the bumper no matter what may be the position of the clamp member 4 on the downwardly curved forward end of the channel member 1. I am also enabled to support the bumper in different positions fore-and-aft of the chassis as the connections hereinafter described may be applied to the channel bars to give the bumper the required position and the bumper then levelled by angularly adjusting the part 3 on the part 4.

In order that the bolt may not be required to take the full stress of impact transmitted to the supporting arm, I form on the supporting arm an arc-shaped rib 12, which is adapted to engage the arc-shaped edge 13 of the boss 7 as shown particularly in Fig. 5.

A very important part of my invention lies in the specific construction of the clamping device, which includes the clamp member 4 and one or more clamp bars 14. In the form of my invention shown in Figs. 1 to 5, each clamp bar is formed with a round shank 15 adapted to pass through one of the holes 6 and threaded at its outer end for engagement by a nut 16. Each clamp bar is adapted to extend under the adjacent flange of the channel member, preferably without touching the same, and to extend round or span its inner edge and extending round the flange to a position to engage the inner side of the web of the channel member opposite part of the clamp member 4, whereby, when the nuts 16 are set up, the web is tightly gripped between the clamp member and the ends of the clamp bars.

It is desirable that the shanks of the clamp bars should fit closely in the holes in the clamp member to prevent the said member tilting on said shanks.

In Figs. 6 and 7 two clamp members 4ª are provided, one for each clamp bar. These, preferably, have their lugs 5ª extended partly under the flange of the channel member to prevent the clamp members from turning. The supporting arm 3, which is integral with the bumper, lies against the outer faces of this clamp member 4ª and is secured thereto through the medium of the clamp members 14ª and nuts 16ª. These clamp bars are in all essential respects similar to the clamp bars 14, but their inner ends do not extend quite to the inner side of the web of the channel member, the difference being made up by a separate shim 17, the result, however, being practically the same, as the shim may be considered either as a thickening of the web of the channel member or else as a non-integral portion of the clamp bar.

In the preferred construction, however, the inner end of each clamp member which extends preferably substantially parallel to the shank, is of sufficient length to contact with the inner side of the web as indicated in Fig. 4 of the drawings. The device may be so arranged that the inner end of each clamp bar will contact with the inner side of the web to as great an extent as possible in a direction transverse of the channel. It is also desirable that the outer side of the bend in the clamp bar should not extend too far inwardly at the inner edge of the flange which the clamp bar spans, as there is frequently very little space between this edge and some other portion of the vehicle. Both these objects may be attained by flattening the bar as shown without reducing the cross sectional area of metal, so that adjacent the edge of the flange the greatest cross sectional dimension of the bar is parallel to the edge of the flange. The inner end of the bar is twisted so that the greatest dimensions of the end which contacts with the web is transverse of the channel, that is, it extends in a direction between the flanges. This shaping of the ends tends to position the supporting member or members in their proper vertical position and brings the clamping point of the web between the two clamping members well away from the flange. It is this location of the clamping point which ensures that the supporting member or members will closely hug the web of the channel member without any tendency to sag or drop.

What I claim is:—

1. Means for connecting an automobile bumper to a channel frame member including a member adapted to fit against the web of the channel member; and two bent one-piece clamp bars each extending through the web abutting member and adapted to span one of the flanges of the channel and engage the inner surface of the web; and means for setting up the clamp bars.

2. In means for connecting an automobile bumper to a channel frame member, a clamp member adapted to lie against the outer side of the web of the channel having two openings therein; securing means passing through said openings; an outwardly offset part formed on the clamp member; a supporting arm pivotally supported on said part to swing in a vertical plane on an axis symmetrically positioned relative to the openings for the securing means; means for clamping the supporting arm in different positions.

3. In means for connecting an automobile bumper to a channel frame member, a clamp member adapted to lie against the outer side of the web of the channel having two openings therein; securing means passing through said openings; an outwardly offset part formed on the clamp member; a supporting arm pivotally supported on said part to swing in a vertical plane on an axis symmetrically positioned relative to the openings for the securing means; means for clamping the supporting arm in different positions including radial interlocking corrugations on the arm and clamp member.

4. In means for connecting an automobile bumper to a channel frame member, a clamp member adapted to lie against the outer side of the web of the channel having two openings therein; securing means passing through said openings; an outwardly offset part formed on the clamp member; a supporting arm pivotally supported on said part to swing in a vertical plane on an axis symmetrically positioned relative to the openings for the securing means; means for clamping the supporting arm in different positions; and arc-shaped engaging ribs on the arm and clamp member adapted to take stresses endwise of the arm towards the pivot.

5. In means for connecting an automobile bumper to a channel frame member, a clamp member adapted to lie against the outer side of the web of the channel having two openings therein; securing means passing through said openings; an outwardly offset part formed on the clamp member; a supporting arm pivotally supported on said part to swing in a vertical plane on an axis symmetrically positioned relative to the openings for the securing means; means for clamping the supporting arm in different positions including radial interlocking corrugations on the arm and clamp member; and arc-shaped engaging ribs on the arm and clamp member adapted to take stresses endwise of the arm towards the pivot.

6. In means for connecting an automobile bumper to a channel frame member, a clamp member adapted to lie against the outer side of the web of the channel having two openings therein; securing means passing through said openings; an outwardly offset part formed on the clamp member; a supporting arm pivotally supported on said part to swing in a vertical plane on an axis symmetrically positioned relative to the openings for the securing means; means for clamping the supporting arm in different positions including radial interlocking corrugations projecting from the adjacent surfaces of the arm and clamp member.

7. In means for connecting an automobile bumper to a channel frame member, a clamp member provided with spaced means for securing it to the chassis of an automobile; an outwardly offset part formed on the clamp member; a supporting arm pivotally supported on said part to swing in a vertical plane on an axis symmetrically positioned relative to the positions of the securing means; means for clamping the supporting arm in different positions.

8. In means for connecting an automobile bumper to a channel frame member, a clamp member provided with spaced means for securing it to the chassis of an automobile; an outwardly offset part formed on the clamp member; a supporting arm pivotally supported on said part to swing in a vertical plane on an axis symmetrically positioned relative to the positions of the securing means; means for clamping the supporting arm in different positions including radial interlocking corrugations on the arm and clamp member.

9. In means for connecting an automobile bumper to a channel frame member, a clamp member provided with spaced means for securing it to the chassis of an automobile; an outwardly offset part formed on the clamp member; a supporting arm pivotally supported on said part to swing in a vertical plane on an axis symmetrically positioned relative to the positions of the securing means; means for clamping the supporting arm in different positions; and arc-shaped engaging ribs on the arm and clamp member adapted to take stresses endwise of the arm towards the pivot.

10. In means for connecting an automobile bumper to a channel frame member, a clamp member provided with spaced means for securing it to the chassis of an automobile; an outwardly offset part formed on the clamp member; a supporting arm pivotally supported on said part to swing in a vertical plane on an axis symmetrically positioned relative to the positions of the securing means; means for clamping the supporting arm in different positions including radial interlocking corrugations on the arm and clamp member; and arc-shaped engaging ribs on the arm and clamp member adapted to take stresses endwise of the arm towards the pivot.

11. In means for connecting an automobile bumper to a channel frame member, a clamp member provided with spaced means for securing it to the chassis of an automobile; an outwardly offset part formed on the clamp member; a supporting arm pivotally supported on said part to swing in a vertical plane on an axis symmetrically positioned relative to the positions of the securing means; means for clamping the supporting arm in different positions including radial interlocking corrugations projecting from the adjacent surfaces of the arm and clamp member.

12. Means for connecting an automobile bumper to a channel frame member including a member adapted to fit against the web of the channel member; a bent clamp bar extending through said member, spanning an adjacent flange of the channel member and provided with an inner end, the extremity of which is adapted to engage the inner surface of the web, said extremity being formed with a projection adapted to space the end from the flange to correspondingly space its line of thrust from said flange; and means for setting up the clamp bar.

13. Means for connecting an automobile bumper to a channel frame member including a member adapted to fit against the web of the channel member; a bent clamp bar extending through said member, spanning an adjacent flange of the channel member and provided with an inner end, the extremity of which is adapted to engage the inner surface of the web, said extremity being formed with a projection adapted to space the end from the flange to correspondingly space its line of thrust from said flange and the clamp bar at its bend being flattened to decrease its thickness, the flattening being in a direction parallel to the edge of the flange of the channel member; and means for setting up the clamp bar.

14. Means for connecting an automobile bumper to a channel frame member including a member adapted to fit against the web of the channel member; a bent clamp bar extending through said member, spanning an adjacent flange of the channel member, said bar being round at its outer end but flattened from the bend to the inner end to decrease its thickness and increase its width, the flattening at the bend being in a direction parallel to the edge of the flange of the channel member and the inner end being twisted to bring the extremity of the end to a position with its greatest dimension transverse of the channel, said extremity being adapted to engage the inner surface of the web; and means for setting up the clamp bar.

Signed at Toronto, Canada, this 14th day of Dec. 1922.

LOUIS M. SINGER.